United States Patent [19]
Koizumi

[11] Patent Number: 5,690,224
[45] Date of Patent: Nov. 25, 1997

[54] STORAGE CASE FOR TAPE CASSETTE

[75] Inventor: Osamu Koizumi, Miyagi, Japan

[73] Assignee: Sony Corporation, Japan

[21] Appl. No.: 572,616

[22] Filed: Dec. 14, 1995

[30] Foreign Application Priority Data

Dec. 24, 1994 [JP] Japan .................................. 6-319883
Apr. 28, 1995 [JP] Japan .................................. 7-105121

[51] Int. Cl.$^6$ .................................................. B65D 85/672
[52] U.S. Cl. ............................................ 206/387.1; 206/493
[58] Field of Search ................................ 206/307, 387.1, 206/387.13, 387.14, 493

[56] References Cited

U.S. PATENT DOCUMENTS

| | | | |
|---|---|---|---|
| 3,587,841 | 6/1971 | Develjian | 206/387.1 |
| 3,876,071 | 4/1975 | Neal et al. | 206/387.13 |
| 4,011,940 | 3/1977 | Neal et al. | 206/387.13 |
| 4,026,615 | 5/1977 | Tazaki et al. | 206/387.1 |
| 4,054,206 | 10/1977 | Kobayashi et al. | 206/387.1 |
| 4,231,474 | 11/1980 | Takahashi | 206/387.13 |
| 4,235,334 | 11/1980 | Ahn | 206/387.1 |
| 4,913,287 | 4/1990 | Kagano | 206/387.1 |
| 4,947,989 | 8/1990 | Horton | 206/387.1 |
| 4,962,854 | 10/1990 | Ricci | 206/387.1 |

FOREIGN PATENT DOCUMENTS

| | | | |
|---|---|---|---|
| 6-183480 | 7/1994 | Japan | 206/387.1 |
| 6-227584 | 8/1994 | Japan | 206/387.1 |
| WO 94/29194 | 12/1994 | Japan | 206/387.13 |

Primary Examiner—Paul T. Sewell
Assistant Examiner—Nhan T. Lam
Attorney, Agent, or Firm—Ronald P. Kananen

[57] ABSTRACT

A storage case for housing a magnetic tape cassette is effective for preventing rotational movement of supply and/or take-up reels of such a tape cassette, even if the case is dropped, transported or subjected impact, or the like. The storage case includes upper and lower halves joined by an elongate hinge which are integrally formed. Projected hub portions are provided on the inner surface of the lower half for engaging drive spaces in the hubs of the reels of the tape cassette to be stored. The hub portions are formed with caps made of a material having the same thermal expansion coefficient as a material from which the reels of the tape cassette are made. In addition, a resilient member may be provided around the outer side of the hub portions for providing added insertion force for surely preventing unwanted rotation of the reels even according to long term storage of the tape cassette at varying temperatures.

12 Claims, 6 Drawing Sheets

STORAGE CASE FOR TAPE CASSETTE

FIELD OF THE INVENTION

The present invention relates to a case for housing a tape cassette. Specifically, the present invention relates to a so-called 'carrying case' for storage and/or transport of magnetic tape cassette cartridges when not in use.

DESCRIPTION OF THE RELATED ART

Recently, substantially large sized magnetic tape cassette cartridges such as DVC (Digital Video Cassette) as well as SD-1 (a digital tape format used for data storage) have been increasingly adopted for various uses. Due the relatively large size of such tape cassettes and in view of the need for secure storage and handling of such cassettes and data which may be stored thereon, is has been required to provide a so-called carrying case (storage case) therefor which can protect the cassette during storage, handling and transportation.. Further, such a storage case must be able to protect the cassette if, for example, it should be dropped or subjected to shock due to vibration or other force.

As an example, an SD-1 tape cassette as mentioned hereinabove may typically have a front width of about 366 mm of a front casing portion thereof, with a height of about 206 mm. Generally, such a SD-1 cassette has a width of 33 mm. Each reel of such a tape cassette may weight up to 700 g with a total weight of the entire cassette in the neighbourhood of 1 kg. Further, such cassette structures often include a one way clutch mechanism as a reel brake to prevent unwanted reel rotation.

For assuring suitable protection of such tape cassettes from damage, the cassette case must securely retain the tape take-up and supply reels and prevent rotation thereof even if the case is subjected to shock. Generally, an insert portion is included inside the case, formed of blow molded polyethylene or the like. The blow molded insert portion includes two projected hubs positioned such that the hubs will be inserted into openings provided at the lower side of the hubs of the supply and take-up reels of the cassette for receiving the driving capstans of a tape recording and/or reproducing device. Upon closing of the case, the blow molded hub portions are inserted under pressure within the openings of the reel hubs and thus prevent unwanted rotation of the reels.

Generally, a storage facility for storing such tape cassettes, which are each kept in a separate case, may vary in temperature from −30° C. to 70° C. However, since a material of the blow molded insert hubs of the case differs from a material from which the reel of the tape cassette is made (i.e. polycarbonate plastic, or the like) the two materials have different thermal expansion coefficients and thus, the possibility of slippage of the reels is present. This, potential for reel slippage increases as the length of time for which the tape cassette is stored increases.

Further, according to such long term storage of such a tape cassette, since the weight of the cassette structure is substantially heavy, as mentioned above, the security of such a carrying case may be further compromised. This is particularly true since the supply reel, which generally holds the entire length of the tape during storage, is thus heavier than the take-up reel and the carrying case is therefore subjected to unbalanced weight distribution, often for extended periods of time. This may cause deformation of a molded hub of the carrying case which is inserted into the supply reel. Further, according to such effect, the supply reel may eventually be urged to move slightly in a winding direction thereof even if a reel brake or the like is disposed to prevent motion of the reel, varying the tape tension of the stored tape. This can lead to abrupt and large variations in tape tension upon winding when the tape is used after storage. This may easily cause cinching and or breakage of the tape.

The above conditions lead to a situation wherein, if different carrying cases have been used for storing different tapes for different amounts of time, a condition of each case will vary somewhat depending on a length of storage and a condition of the stored tape. Should such a case be then used to store a tape other than that originally stored, the fit between the molded hubs of the case and the insert spaces of the cassette supply and take up reels cannot be assured and again the storage security of such a carrying case is impaired.

Thus it has been required to provide a storage and/or carrying case for a tape cassette which will maintain secure storage over long periods of time and is not subject to deformation which will impede future performance of the case. Further it is desired to provide a case for a tape cassette which can be kept in general use for extended periods without being subject to specific damage according to use in storing a particular tape cassette. Further, it is desired to prevent variation in winding pressure of the cassette during use, which may lead to cinching, or wrinkling of the tape and thus damage to data, or the like stored thereon.

SUMMARY OF THE INVENTION

Thus, it is an object of the present invention to overcome the drawbacks of the related art.

It is a further object of the invention to provide a storage and/or carrying case for a tape cassette which will maintain secure storage over long periods of time and is not subject to deformation which will impede future performance of the case.

It is also an objection of the invention to provide a case for a tape cassette which can be kept in general use for extended periods without being subject to specific damage according to use in storing a particular tape cassette.

In addition, the present invention seeks to provide a storage case for a tape cassette which can effectively prevent variation in a winding pressure of the cassette during use after storage, which may lead to cinching, or wrinkling of the tape and thus damage to data, or the like stored thereon.

According to a first aspect of the invention, there is provided a storage case for a tape cassette, comprising: a lower casing portion substantially allowing insertion of a lower shell portion of the tape cassette; an upper casing portion substantially allowing insertion of an upper shell portion of the tape cassette; an elongate hinge member connecting the lower and upper casing portions; a plurality of hub base portions projected from an inner surface of one of the lower and upper casing portions; and a cylindrical cap member attached respectively over each of the hub base portions, each cap member including: tapered annular outer wall having a diameter at a lower side thereof which is greater than that of an upper side thereof; flat upper surface portion formed integrally with the outer wall; wherein a thermal expansion coefficient of a material of the cap member is the same or less than that of a material of which reel portions of the tape cassette are formed.

According to another aspect of the invention, there is provided a storage case for a tape cassette, comprising: a lower casing portion substantially allowing insertion of a lower shell portion of the tape cassette; an upper casing portion substantially allowing insertion of an upper shell portion of the tape cassette; an elongate hinge member connecting the lower and upper casing portions; a plurality of hub base portions projected from an inner surface of one of the lower and upper casing portions; and a cylindrical cap member attached respectively over each of the hub base portions, each cap member being integrally formed and including: tapered annular outer wall having a diameter at a lower side thereof which is greater than that of at upper side thereof, a taper angle of the tapered outer wall portion being 2° or less; a flat upper surface portion having a plurality of openings provided therethrough; an engaging member interlocking with a receiving portion of the hub base portion is provided at a lower side of the flat upper surface portion so as to prevent rotation of the cap member according to installation thereof; an annular retaining flange formed at the lower side of the tapered outer wall portion engaging a corresponding annular recess formed around the hub base portion; an annular beveled outer wall portion is provided between the tapered outer wall and the flat upper surface portion; a resilient member disposed around the outer wall portions; and wherein a thermal expansion coefficient of a material of the cap member is the same or less than that of a material of which reel portions of the tape cassette are formed.

DESCRIPTION OF THE PREFERRED EMBODIMENT

Figure 1:
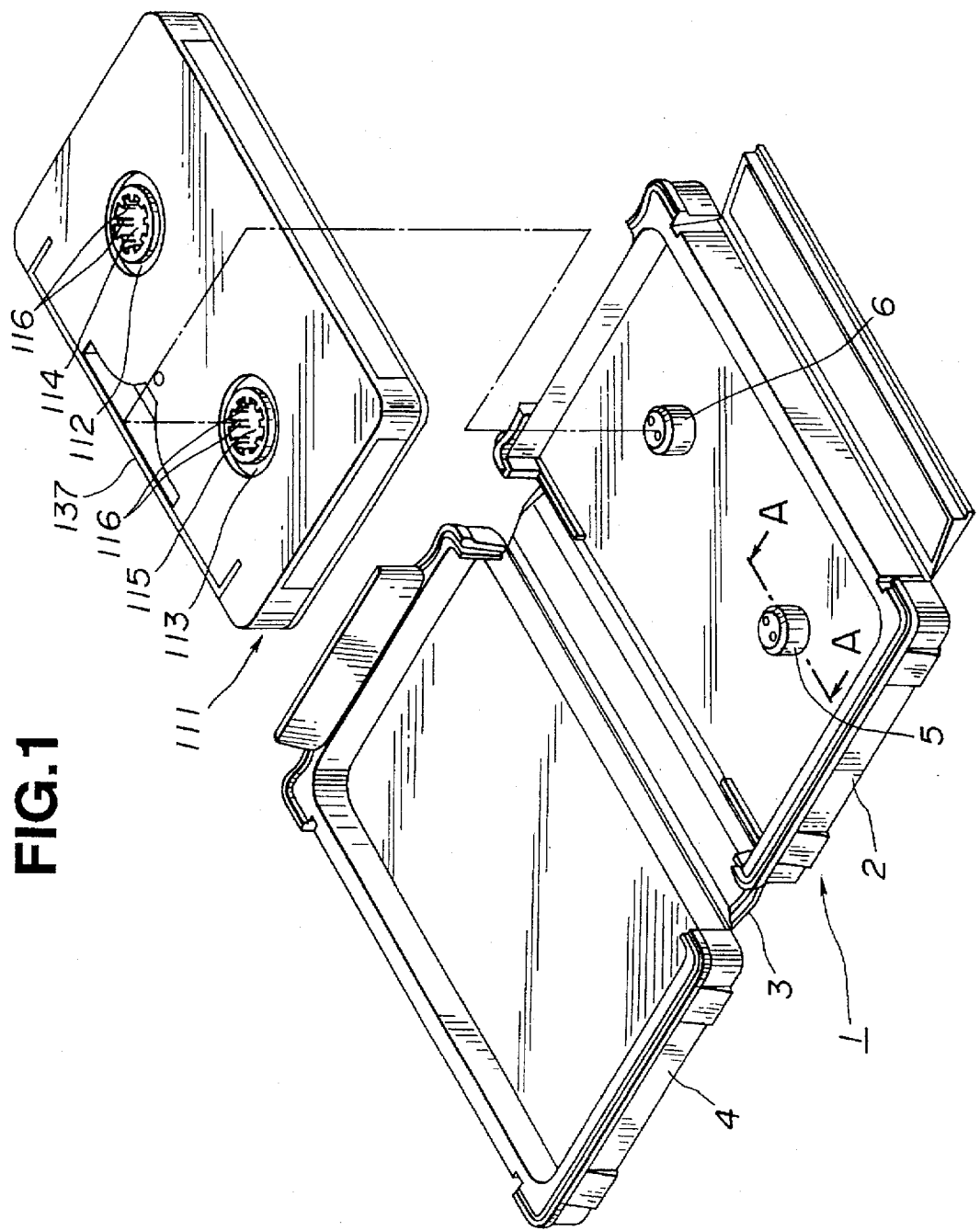
FIG. 1 is a perspective view of a cassette storage case according to a preferred embodiment of the invention.

Hereinbelow, a preferred embodiment of the invention will be explained in detail with reference to the drawings. Referring to FIG. 1, a perspective view of a tape cassette storage case according to a first preferred embodiment of the invention is shown. As may be seen, the storage case 1 for a tape cassette 111 according to the present embodiment includes a main body portion 2 which may comprise a casing lower half, a lid member 4, which may comprise a casing upper half, and an elongate hinge portion 3 interposed between the main body portion 2 and the lid member 4. Hub members 5, 6 are projected from the inner surface of the lower casing half, i.e. the main body portion 2 position so as to engage drive openings 114, 115 of supply and take-up reels 112, 113 of the tape cassette 111. It will further, be noted that engaging tooth, or rib portions 116 are provided around the inner circumference of the drive openings 114, 115 for surely engaging drive capstans of a tape device (not shown).

According to the present embodiment, the main body portion 2, the hinge 3 and the lid member 4 may be integrally formed of polyethylene or the like by blow molding or other suitable technique.

It will further, be noted that the supply and take up reels 112, 113 of the tape cassette are formed of a substantially hard synthetic resin such as polycarbonate.

Figure 2:
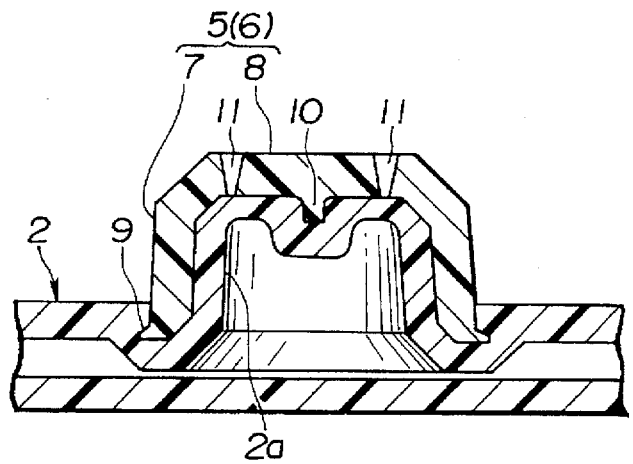
FIG. 2 is a cross-sectional view of a hub portion of the storage case, taken along line A—A of FIG. 1.
Figure 3:
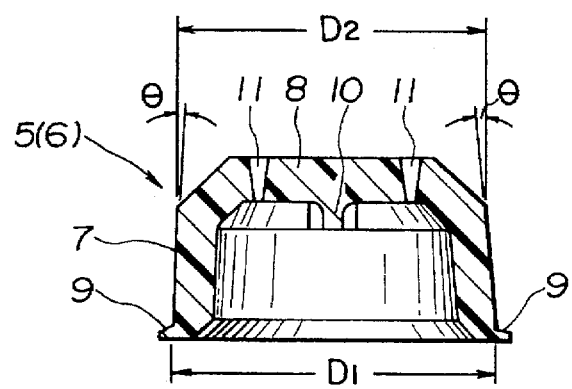
FIG. 3 is a cross-sectional view of cap portion of the hub of a storage case according to the invention.
Figure 4:
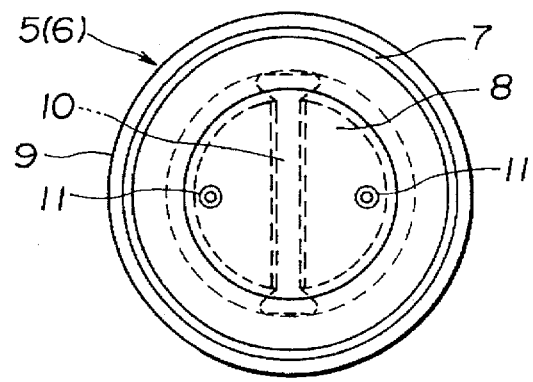
FIG. 4 is a plan view of the hub of the invention including a cap portion thereof.

Referring now to FIGS. 2–4, is may be seen that the hub members 5, 6 of the storage case according to the present embodiment are formed as a projected base 2a which may be molded integrally with the main body portion 2, and a cap member 7 which is fitted over the projected base 2a.

The cap member 7 includes a flat upper surface plate 8. Further, referring to FIG. 3, it may be seen that a lower diameter D1 of the cap member 7 is larger than an upper diameter D2 thereof. That is, the side wall of the cap member 7 is configured to taper by a predetermined angle Ø in the upward direction of the cap member 7. According to the present embodiment, the taper angle Ø is set at 2° or less. An annular flange portion 9 is provided at a lower side of the cap portion 7 to securely retain the cap portion 7 in a molded recess of the projected base portion 2a.

Further, as seen in FIG. 4, a diametrical projection 10 is formed in a lower side of the flat upper surface plate 8 engaging with a diametric recess of the base portion 2a so as to prevent rotation of the cap member 7 when installed over the base portion 2a. It will also be noted that a plurality of breathing openings 11 are formed through the flat upper surface plate 8. It will be noted that, according to the present embodiment, the breathing openings 11 are tapered in a direction opposite that of the tapered outer wall of the cap portions 7. Also, a beveled portion is provided between the outer wall of the cap portion and the upper surface plate 8 and it will further be noted that the base portion 2a includes a corresponding beveled portion as well as a beveled annular base such that the cap portion 7 of the hubs 5, 6 are firmly supported.

Figure 5:
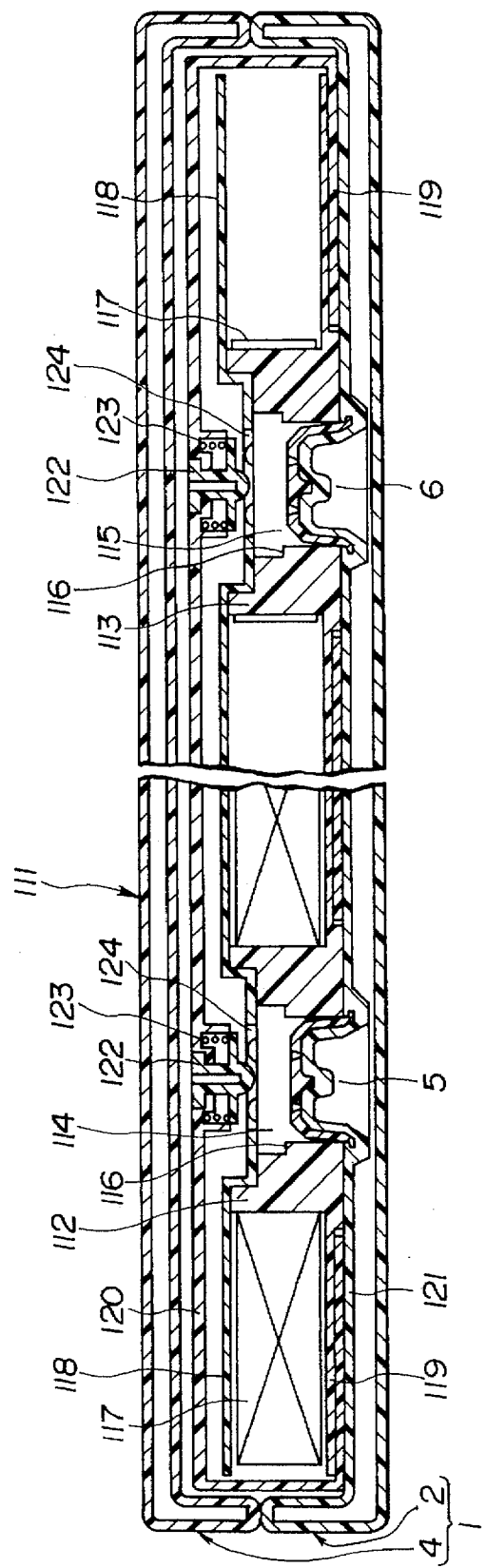
FIG. 5 is a cross-sectional side view of a tape cassette stored in a storage case according to the invention.

Referring now to FIG. 5, a tape cassette 111 is shown inserted in a storage case 1 according to the invention. As may be seen in the drawing, magnetic tape 117 is wound between the supply and take-up reels 112, 113 which respectively include upper and lower flanges 118, 119. The tape cassette casing is formed as upper and lower shells 120, 121. The upper shell 120 includes downwardly projected reel axes 122 and reel springs 123 installed thereon biased against reel plates 124 of the supply and take up reels 112, 113 respectively.

Figure 6:
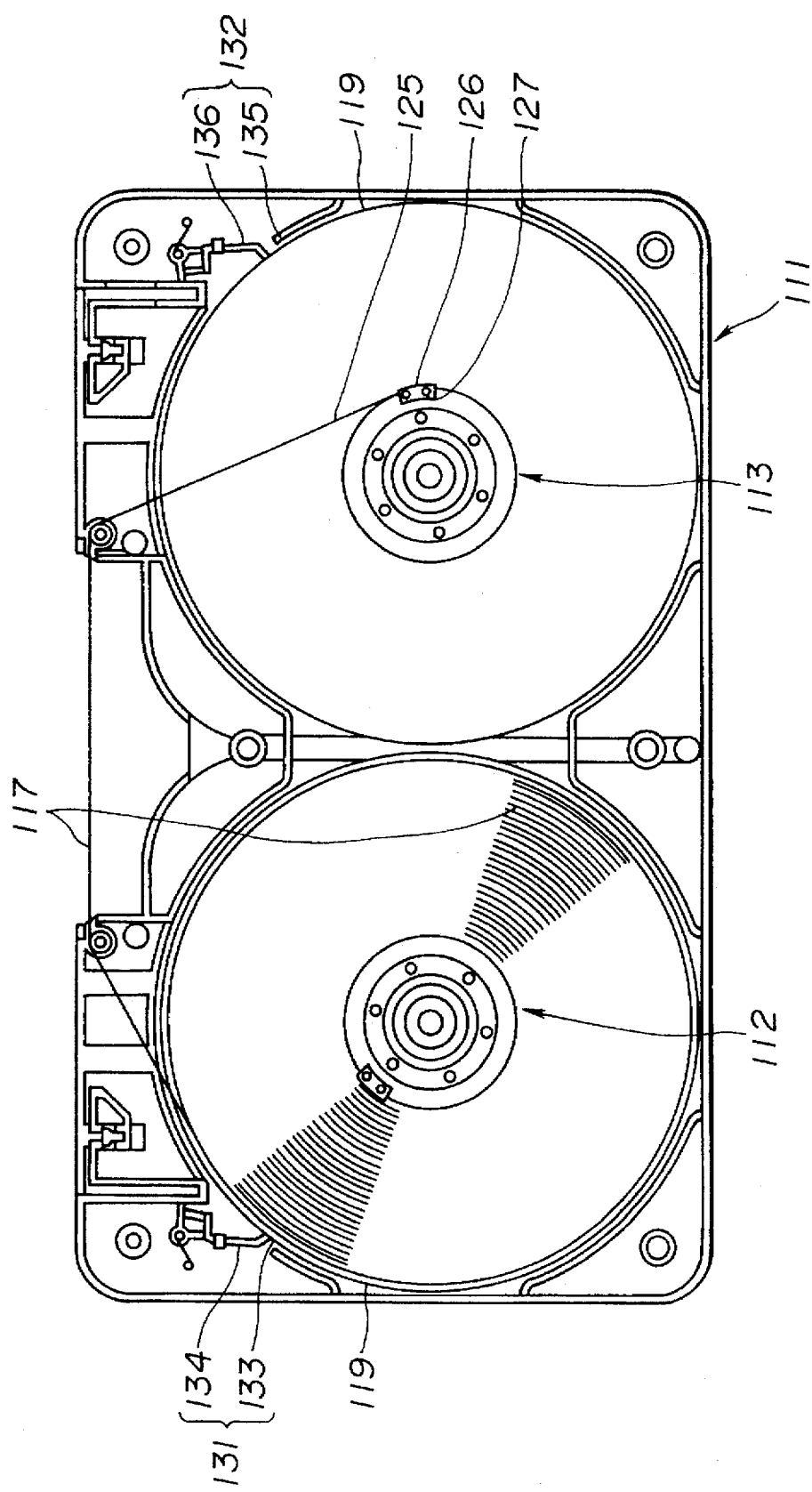
FIG. 6 is a plan view of the tape cassette of FIG. 5.

As best seen in FIG. 6, the magnetic tape 117 is installed via a leader tape 125 having a predetermined length which is attached to the take up and/or supply reel 112, 113 by a clamp member 126 inserted into an engaging slot provided on the supply and take up reels 112, 113 so as to clamp the leader tape 125 to the supply and take up reels 112, 113 according to insertion of the clamp member 126 in the slot 127. The outer circumference of lower flange portions 119 of each of the supply and take-up reels 112, 113 are formed with tooth portions 133, 135 engaged with locking members 134, 136 respectively to form first and second ratchet mechanisms 131, 132.

The ratchet mechanisms operate such that, when a cassette lid 137 (see FIG. 1) of the tape cassette 111 is in an open condition the first ratchet mechanism 131 is operable to stop rotation of the supply reel 112 in a supply side tape unwinding direction (clockwise in FIG. 6) while the second ratchet mechanism 132 is operable to stop rotation of the take up reel 113 in a take up side tape unwinding direction (counterclockwise in FIG. 6).

Figure 7:
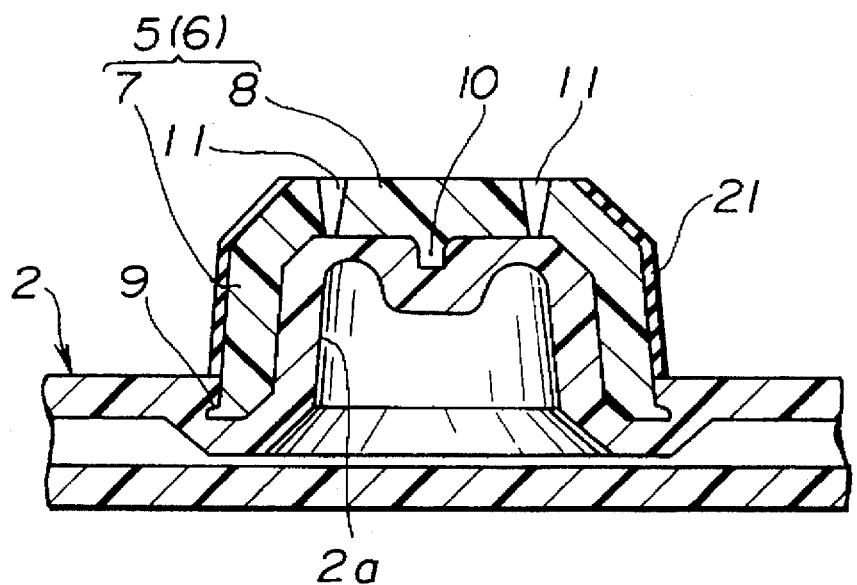
FIG. 7 is a cross-sectional view of elastic member, hub portion and cap portion according to a second preferred embodiment of the invention.
Figure 8:
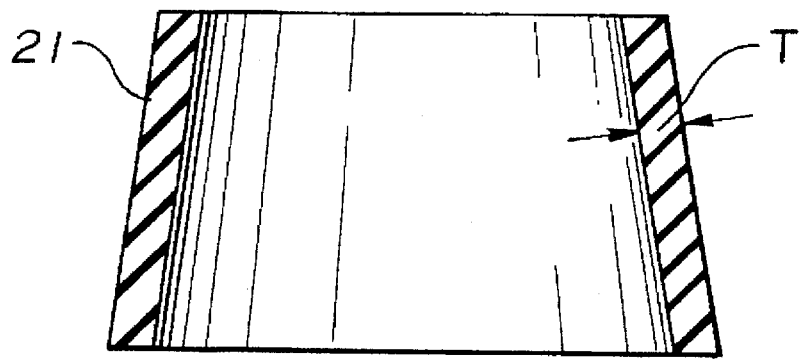
FIG. 8 is a cross-sectional view of an elastic portion utilized according to the second embodiment of FIG. 7.

Referring now to FIGS. 7 and 8 a modification of the above-described hub structure of a tape cassette storage case according to the preferred embodiment will be described in detail herein below.

As may be seen in the drawings, the modification according to the invention comprises provision of an elastic member 21 at an outer side of the cap members 7, 7 of the hubs 5 and 6. As may be appreciated from FIG. 8, the elastic member is formed as a tapered tube section which may be tightly fitted around the outer wall of the cap member 7 including the upper annular beveled area while the flat upper surface plate 8 remains exposed. According to the present embodiment, the elastic member may be formed of silicon rubber or other suitable material which can retain elasticity at substantially low temperatures (i.e. 5° C. according to the present embodiment). According to this, additional friction is provided between the hub members 5, 6 and the drive spaces 114, 115 and drive ribs 116, 116 of the supply and take up reels 112, 113 such that rotation prevention characteristics of the storage case of the invention are further enhanced. Also, low temperatures will not degrade operation.

According to this, a thickness T of the elastic member 21 is determined for providing additional insertion pressure when the hub portions 5, 6 are inserted into the drive spaces 114, 115 of the supply and take up reels 112, 113 such that an insertion pressure of 550 g or greater may be obtained. Thus the reels of even large sized tape cassettes 111 may be reliably secured.

It will further be noted that the material of the cap portion, including the integral flat upper surface plate 8, etc., is formed of polycarbonate or other material selected so as to have the same (or smaller) thermal expansion coefficient as the supply and take up reels 112, 113 of the tape cassette 111, thus firm engagement of the hubs 5, 6 is assured even according to long term storage at varying temperatures.

Although the elastic member 21 according to the above description is formed of silicon rubber, it will be noted that the elastic member 21 may alternatively be formed of urethane rubber or the like.

Further, according to provision of the taper angle Ø easy insertion of the hub portion 5, 6 into the drive spaces 114, 115 is assured and sticking or jamming of the supply and take up reels 112, 113 on the hub portions 5, 6 is avoided.

And, according to the high insertion strength provided according to provision of the elastic member 21 between the hub portion 5, 6 and the drive spaces 114, 115 unwanted rotation of the supply and take up reels is surely prevented.

Figure 9:
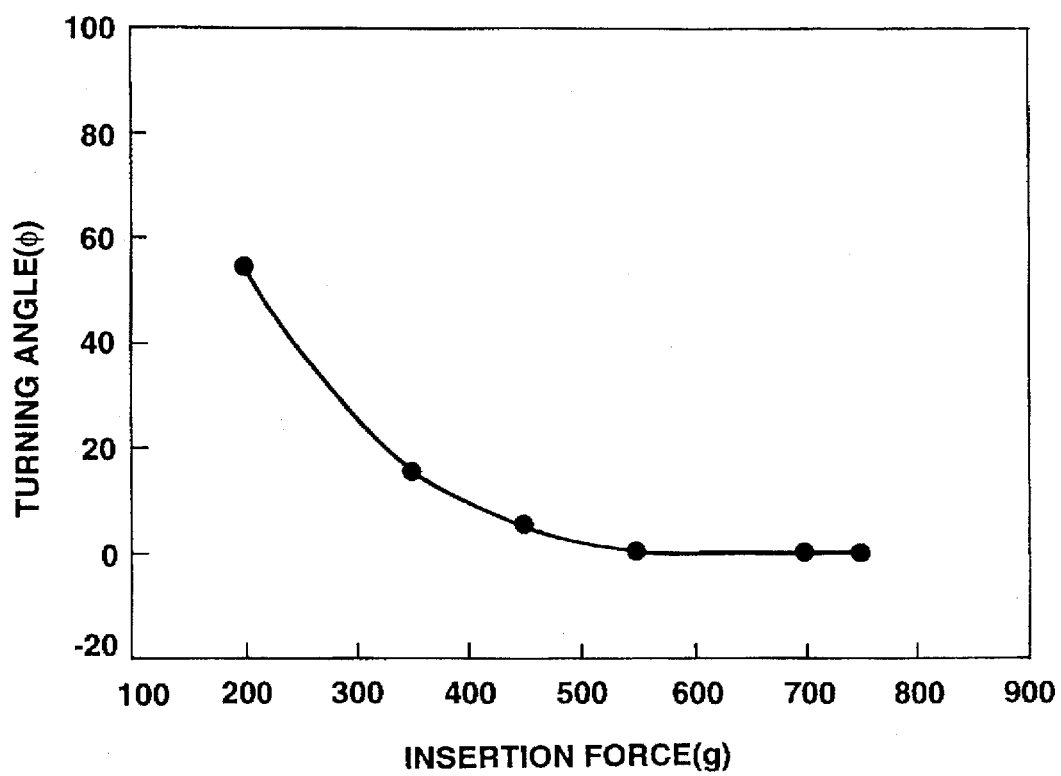
FIG. 9 is a graph showing results of cinching testing carried out for tape cassettes stored in a storage casing according to the invention wherein each black dot represents testing carried out for 60 minutes at 5° C.

Referring to FIG. 9 it may be seen that, according to provision of the elastic member 21 when subjected to hour long testing at low temperatures (5° C.), a turning angle of a tape cassette reel was significantly reduced according to a degree of insertion force (pressure g) of the hub members 5, 6. At the obtained insertion force of 550 g according to utilizing the elastic members 21, substantially no turning of the supply and take up reels was incurred.

Thus, according to the present invention as described herein above, there is provided a storage case for a tape cassette which maintains secure storage over long periods of time and is not subject to deformation which will impede future performance of the case. Further a storage case for a tape cassette is provided which may be kept in general use for extended periods without being subject to specific damage according to use in storing a particular tape cassette.

Also, variation in winding pressure of the cassette during use, which may lead to cinching, or wrinkling of the tape is prevented according to the structure of the storage case according to the invention.

It will be noted that, although the preferred embodiment is set forth in terms of a storage case for large cassettes such as DVC or SD-1 types, the present invention may be embodied in various different ways without departing from the principle of the invention as herein set forth.

The present invention is not limited only to the description as herein disclosed but may be modified and embodied in other ways without departing from the scope or inventive concept of the invention as set forth above.

What is claimed is:

1. A storage case for a tape cassette 2, comprising:
   a lower casing portion substantially allowing insertion of a lower shell portion of said tape cassette;
   an upper casing portion substantially allowing insertion of an upper shell portion of said tape cassette;
   a hinge member connecting said lower and upper casing portions;
   a plurality of hub base portions protected from an inner surface of one of said lower and upper casing portions; and
   a cylindrical cap member attached respectively over each of said hub base portions, each cap member including:
      a tapered annular outer wall having a diameter at a lower side thereof which is greater than that of an upper side thereof; and
      a flat upper surface portion formed integrally with said outer wall;
      wherein a thermal expansion coefficient of a material of said cap member is the same or less than that of a material of which reel portions of said tape cassette are formed, and wherein a plurality of openings are provided through said flat upper surface portion.

2. A storage case for a tape cassette, comprising:
   a lower casing portion substantially allowing insertion of a lower shell portion of said tape cassette;
   an upper casing portion substantially allowing insertion of an upper shell portion of said tape cassette;
   a hinge member connecting said lower and upper casing portions;
   a plurality of hub base portions protected from an inner surface of one of said lower and upper casing portions; and
   a cylindrical cap member attached respectively over each of said hub base portions, each cap member including:
      a tapered annular outer wall having a diameter at a lower side thereof which is greater than that of an upper side thereof; and
      a flat upper surface portion formed integrally with said outer wall;
      wherein a thermal expansion coefficient of a material of said cap member is the same or less than that of a material of which reel portions of said tape cassette are formed, and wherein an engaging member interlocking with a receiving portion of said hub base portion is provided at a lower side of said flat upper surface so as to prevent rotation of said cap member relative to said hub base portion.

3. A storage case for a tape cassette as set forth in claim 1, wherein said openings are tapered such that an upper side thereof has a larger diameter than a lower side thereof.

4. A storage case for a tape cassette, comprising:
   a lower casing portion substantially allowing insertion of a lower shell portion of said tape cassette;

an upper casing portion substantially allowing insertion of an upper shell portion of said tape cassette;

a hinge member connecting said lower and upper casing portions;

a plurality of hub base portions protected from an inner surface of one of said lower and upper casing portions; and a cylindrical cap member attached respectively over each of said hub base portions, each cap member including:
 a tapered annular outer wall having a diameter at a lower side thereof which is greater than that of an upper side thereof; and
 a flat upper surface portion formed integrally with said outer wall;
 wherein a thermal expansion coefficient of a material of said cap member is the same or less than that of a material of which reel portions of said tape cassette are formed, and wherein an annular retaining flange is formed at said lower side of said outer wall of each of said cap members which engages a corresponding annular recess formed around each of said hub base portions, respectively.

5. A storage case for a tape cassette, comprising:

a lower casing portion substantially allowing insertion of a lower shell portion of said tape cassette;

an upper casing portion substantially allowing insertion of an upper shell portion of said tape cassette;

a hinge member connecting said lower and upper casing portions;

a plurality of hub base portions protected from an inner surface of one of said lower and upper casing portions; and a cylindrical cap member attached respectively over each of said hub base portions, each cap member including:
 a tapered annular outer wall having a diameter at a lower side thereof which is greater than that of an upper side thereof; and
 a flat upper surface portion formed integrally with said outer wall; wherein
 a thermal expansion coefficient of a material of said cap member is the same or less than that of a material of which reel portions of said tape cassette are formed;

further including a resilient member disposed around said outer wall of each of said cap members of said hub base portions.

6. A storage case for a tape cassette as set forth in claim 5, wherein said resilient member is formed of a material which retains resiliency at substantially low temperatures.

7. A storage case for a tape cassette as set forth in claim 5, wherein said resilient member is formed of a material which retains resiliency at temperatures as low as 5° C.

8. A storage case for a tape cassette as set forth in claim 5, wherein a thickness of said resilient member is selected to provide an insertion force of said hub base portions in drive spaces of said reel portions of 550 g or greater.

9. A storage case for a tape cassette as set forth in claim 8, wherein said resilient member is formed of silicon resin.

10. A storage case for a tape cassette as set forth in claim 5, wherein said resilient member is formed as a tapered tube section having upper and lower diameters determined so as to allow said resilient member to fit snugly around a peripheral side wall of said hub base portion.

11. A storage case for a tape cassette as set forth in claim 5, wherein said resilient member is formed of urethane resin.

12. A storage case for a tape cassette, comprising:

a lower casing portion substantially allowing insertion of a lower shell portion of said tape cassette;

an upper casing portion substantially allowing insertion of an upper shell portion of said tape cassette;

an elongate hinge member connecting said lower and upper casing portions;

a plurality of hub base portions projected from an inner surface of one of said lower and upper casing portions; and a cylindrical cap member attached respectively over each of said hub base portions, each cap member being integrally formed and including:

tapered annular outer wall having a diameter at a lower side thereof which is greater than that of at upper side thereof, a taper angle of said tapered outer wall portion being 2° or less;

a flat upper surface portion having a plurality of openings provided therethrough;

an engaging member interlocking with a receiving portion of said hub base portion is provided at a lower side of said flat upper surface portion so as to prevent rotation of said cap member according to installation thereof;

an annular retaining flange formed at said lower side of said tapered outer wall portion engaging a corresponding annular recess formed around said hub base portion;

a annular beveled outer wall portion is provided between said tapered outer wall and said flat upper surface portion;

a resilient member disposed around said outer wall portions; and wherein a thermal expansion coefficient of a material of said cap member is the same or less than that of a material of which reel portions of said tape cassette are formed.

* * * * *